(12) United States Patent
Taylor et al.

(10) Patent No.: US 9,330,151 B1
(45) Date of Patent: May 3, 2016

(54) DATABASE CHANGE DATA CAPTURE WITHIN A STORAGE ARRAY

(71) Applicant: EMC Corporation, Hopkinton, MA (US)

(72) Inventors: Kenneth J Taylor, Franklin, MA (US); Balakrishnan Ganeshan, Foster City, CA (US); Lance Fang, Elk Grove, CA (US)

(73) Assignee: EMC Corporation, Hopkinton, MA (US)

( * ) Notice: Subject to any disclaimer, the term of this patent is extended or adjusted under 35 U.S.C. 154(b) by 67 days.

(21) Appl. No.: 13/790,341

(22) Filed: Mar. 8, 2013

(51) Int. Cl.
*G06F 17/30* (2006.01)

(52) U.S. Cl.
CPC .... *G06F 17/30569* (2013.01); *G06F 17/30002* (2013.01); *G06F 17/30368* (2013.01)

(58) Field of Classification Search
CPC .................................................. G06F 17/30368
USPC ........................................................ 707/625
See application file for complete search history.

(56) References Cited

U.S. PATENT DOCUMENTS

| 2004/0107296 | A1* | 6/2004 | Donker ............ G06F 17/30902 709/245 |
| 2005/0193034 | A1* | 9/2005 | Kitsuregawa et al. ........ 707/202 |
| 2007/0299885 | A1* | 12/2007 | Pareek et al. ................. 707/202 |
| 2011/0167229 | A1* | 7/2011 | Szalay et al. ................. 711/154 |

* cited by examiner

*Primary Examiner* — Kris Mackes
(74) *Attorney, Agent, or Firm* — Van Pelt, Yi & James LLP (57) ABSTRACT

A log is identified which includes one or more transactions to a source database. The log is ingested using a processor included in a storage processor complex, where the storage processor complex includes storage and a processor associated with the storage. The ingested information is transformed into change data appropriate for a target database stored at least in part on the storage processor complex. The change data is applied to the target database.

24 Claims, 7 Drawing Sheets

```
> symrdb list -type oracle file -db <source database name>
> DATABASE FILE NAMES (ORACLE 8.1.7.0.0):
  DB File Name                                  Type      Status
  ------------                                  ----      ------
  /usr/oracle/oradata/64817/control01.ctl       Control   Online
  /usr/oracle/oradata/64817/rbs01.dbf           Data      Online
  /usr/oracle/oradata/64817/system01.dbf        Data      Online
  /usr/oracle/oradata/64817/temp01.dbf          Data      Online
  /usr/oracle/oradata/64817/redo01.log          Log       Online
  /usr/oracle/oradata/64817/redo02.log          Log       Online
  /usr/oracle/oradata/64817/redo03.log          Log       Online
>
```

FIG. 5

```
> symrslv file /usr/oracle/oradata/64817/redo01.log -expand -
blocks
> Absolute Path : /usr/oracle/oradata/64817/redo01.log
  Number of Physical Devices : 4
  File System Mount Point : /fs_test1
  File System Device Name : /dev/vx/dsk/fsvg/Striped
  Number of Mirrors for object (1):
  {
  1) Mirror Configuration
  Mirror Stripe Columns : 4
  Mirror Stripe Size : 32b
  Mirror Physical Extents (94):
  {
  -----------------------------------------------------------------
  Size  Array  Dev   Offset  PPdevName              Offset
  -----------------------------------------------------------------
  16b   00541  00A0  3312b   /dev/vx/rdmp/c4t2d0s2  3312b (S)
  16b   00541  00A4  3296b   /dev/vx/rdmp/c4t2d1s2  3296b (S)
  }
  Mirror Physical Devices (4):
  {
  -----------------------------------------------------------------
  Array Dev    PPdevName              PdevName
  -----------------------------------------------------------------
  00541 00A0   /dev/vx/rdmp/c4t2d0s2   /dev/vx/rdmp/c4t2d0s2 (M)
  00541 00A4   /dev/vx/rdmp/c4t2d1s2   /dev/vx/rdmp/c4t2d1s2 (M)
  03122 0009   /dev/vx/rdmp/c5t0d1s2   /dev/vx/rdmp/c5t0d1s2 (S)
  }
  Legend for the Attribute of Devices:
  (C): CLARiiON Device.
  (S): Symmetrix Device.
  (M): Symmetrix Device Meta Head.
  (m): Symmetrix Device Meta member.
>
```

DATABASE CHANGE DATA CAPTURE WITHIN A STORAGE ARRAY

BACKGROUND OF THE INVENTION

Change data capture is a technique in which changes made to one database are recorded and those records are used to replicate the same changes in a second database. For example, the second database may be a backup/recovery database or an analytic database. The amount of data being managed by databases is even larger than ever, which negatively affects the performance of change data capture systems. New change data capture systems with improved performance would be desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A technique for performing change data capture (CDC) processing is described herein. The technique is performed at least in part by a storage processor complex which includes storage and a processor associated with the storage. A log which includes one or more transactions to a source database is identified. In various embodiments, the log is located in the source database or the storage processor complex. The log is ingested using a processor included in a storage processor complex. The storage processor complex is associated with a target database (e.g., the target database is located at least in part on the storage processor complex). The ingested information is transformed into change data appropriate for a target database stored at least in part on the storage processor complex. In various embodiments, temporary storage is used to store the ingested information and/or transform the ingested information. In one example, the target database is an analytic database. The change data is then applied to the target database. In some embodiments, the change is applied to the target database by a processor included in the storage processor complex (e.g., one that performed a previous step or a new processor not previously involved).

Figure 1:
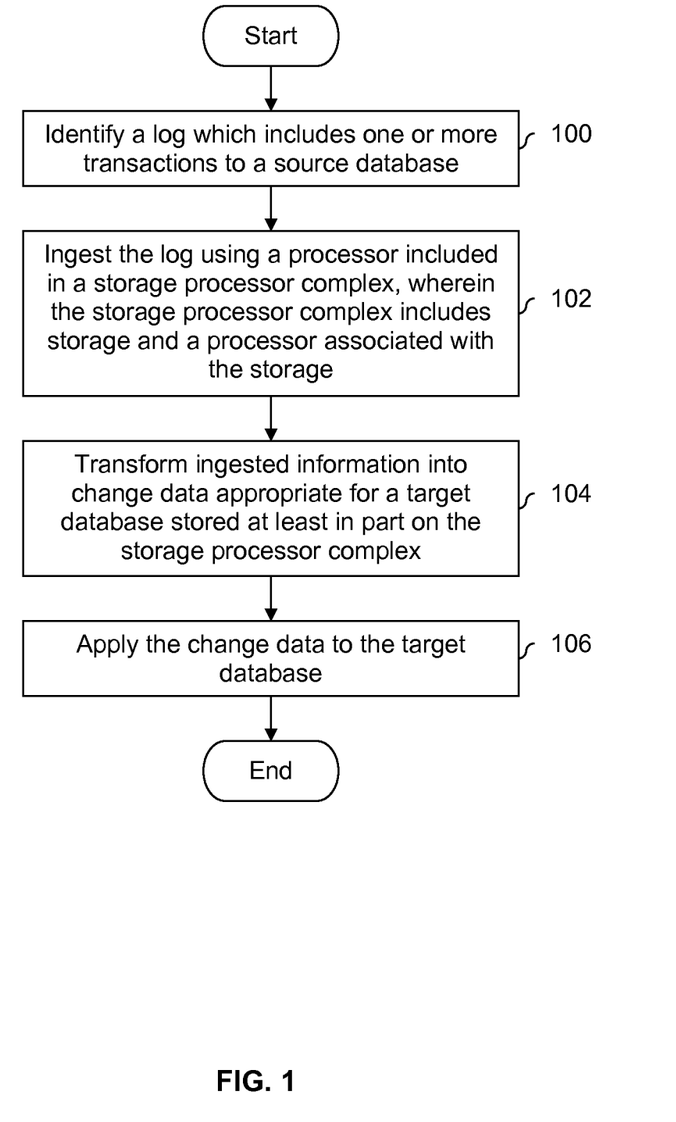
FIG. 1 is a flowchart illustrating an embodiment of a process for performing a change data capture (CDC) process.

FIG. 1 is a flowchart illustrating an embodiment of a process for performing a change data capture (CDC) process. At 100, a log is identified which includes one or more transactions to a source database. For example, a log (sometimes referred to as a journal) may include transactions which describe or record changes made to the source database between a first point in time and a second point in time, or between a first state of the system and a second state of the system. CDC processes relate to recording and make use of these changes between two points in time or two states which are recorded in a log. In some embodiments, the source database writes the log file.

In some embodiments, step 100 includes identifying the physical locations of components (such as blocks) which make up or comprise a log. For example, this may enable a process (e.g., which accesses or reads the log) to access the components directly at the component level and/or without having to go through an operating system or file system. For a variety of reasons, it may be difficult or impossible to pass a higher level command or instructions (e.g., "read <log>" or "open <log>") to an operating system or file system in order to access a log. Some examples of this are described in further detail below.

In some embodiments, step 100 includes identifying a format or type associated with a log. For example, different source databases may use different log formats or log types when writing a log and in order to properly interpret the information in a log, the format or type is determined or identified. The type or format may, for example, be used to select an appropriate downstream process from a plurality of downstream processes, each of which is configured to work with a particular log type.

At 102, the log is ingested using a processor included in a storage processor complex, wherein the storage processor complex includes the processor and storage associated with the processor. In one example, Informatica Data Replication is used at step 102 to ingest a log.

A storage processor complex includes one or more units (e.g., devices) of storage and one or more associated processors. In some embodiments, a given processor is dedicated to or paired with a given storage device. In some such embodiments, a processor is co-located with its associated storage (e.g., they are in the same device). Alternatively, a processor and its associated storage may be on separate devices and they are connected together via some (e.g., local) connection. In some embodiments, a given processor is not necessarily dedicated to or paired with a given storage device. One example of a storage processor complex is EMC's Symmetrix VMAX. Some storage processor complex embodiments are described in further detail below.

At 104, the ingested information is transformed into change data appropriate for a target database stored at least in part on the storage processor complex. In some embodiments, a target database provider (e.g., EMC Corporation if the target database is a Greenplum database) provides applications, tools, schema, and/or descriptions which enable the transformation of the ingested information into a form or style that can be understood by and/or is relevant to the target database. This may include, for example, grooming attribute types (which are permitted in the source database) into ones that are permitted in the target database. In another example, a source database may have different rules regarding names or paths (e.g., names are case sensitive/names are not case sensitive, spaces permitted in names/spaces not allowed in names, etc.) and this is cleaned up during transformation at 104. In one example, a source database is a transactional database and a target database is a data warehouse and transforming includes transforming the transactional data into a form appropriate for the data warehouse. In some embodiments, no transformation is performed, for example because any data grooming tasks are performed internally by the target database functions.

In some embodiments, a processor which performs step 102 also performs step 104. In some other embodiments, some other processor in a storage processor complex performs step 104.

The change data is applied to the target database at 106. In some embodiments, the same processor which ingested the log at 102 and/or which transformed the ingested information at 104 performs step 106. In some embodiments, some other processor in the storage processor complex performs step 106. For example, a processor dedicated to or associated with the target database may perform step 106 but does not perform step 102 and/or step 104. The process of FIG. 1 may be repeated as desired (e.g., at a scheduled update time, if initiated by a user or a CDC process, if a certain amount of changes or transactions have been made on the source database, etc.).

Since the target database is stored at least in part on the storage processor complex and at least some of the steps in FIG. 1 are performed by a processor in the storage processor complex, relatively short distances are traversed and performance may be better than some other systems where information is exchanged over much longer distances. Some system diagrams showing various embodiments of FIG. 1 are described in further detail below.

In some embodiments, the example process of FIG. 1 is part of or associated with a platform over which various parties provides various tools for performing the steps shown in FIG. 1. For example, a storage processor complex provider may specify or define a platform for performing the process of FIG. 1 but does not necessarily build all of the tools or processes which perform the steps shown in FIG. 1. For example, another company (e.g., the provider of the source database or a third-party database management company) may provide tools and/or processes for identifying a log at 100. A storage processor complex provider may build its own tool or process for ingesting the log at 102, or a tool or process from a third-party database management company (e.g., Informatica) may be used at 102. Yet another company (e.g., the provider of the target database or a third-party database management company) may provide tools or processes for performing steps 104 and/or 106. These example tools from different entities operate with a defined platform to accomplish the example process of FIG. 1.

In some embodiments, the process of FIG. 1 is preceded by an initial setup or importation of associated databases or devices. For example, an initial setup or initial importation of a target database onto a storage processor complex may be performed. Any appropriate tool or process for performing the initial setup or importation may be used. In one example, Informatica Fast Clone is used to copy the source database to a storage processor complex, thus creating or setting up a target database which is subsequently updated using the process of FIG. 1.

In various embodiments, various systems perform the example process of FIG. 1. The following figures show some such example systems.

Figure 2:
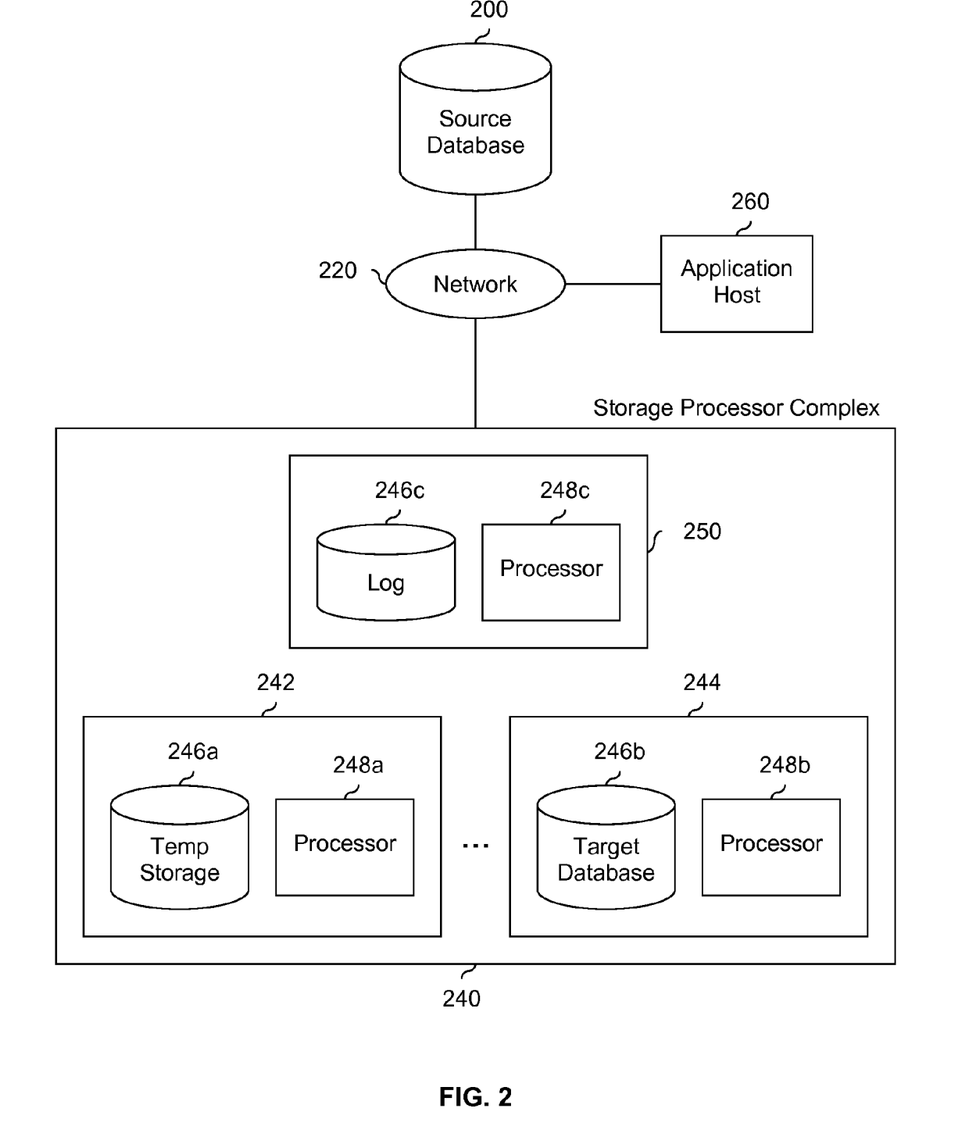
FIG. 2 is a diagram showing an embodiment of a storage processor complex with pairs of storage and processors.

FIG. 2 is a diagram showing an embodiment of a storage processor complex with pairs of storage and processors. In the example shown, storage processor complex 240 includes a plurality of pairs of storage devices and associated processors. In some embodiments, a storage device and its associated processor (e.g., in a given pair) are co-located on the same device. The storage in pair 242 is temporary storage 246a, the storage in pair 244 is target database 246b, and the storage in pair 250 is log 246c (associated with source database 200). For clarity, a single unit of storage is shown for temporary storage 246a and target database 246b, but any number of storage devices may be used for either.

In this example, source database 200 stores its log (i.e., log 246c) on storage processor complex 240. In some embodiments, a source database (e.g., 200) is an operational database. For example, a source database may be owned by a retailer and the source database stores and manages transactions (e.g., purchases, returns, or exchanges) which are updated in substantially real-time as transactions are performed. In some embodiments, a source database is an online transaction processing (OLTP) database. In one example, a source database is an Oracle database.

In this example, processor 248a accesses log 246c and sends it to temporary storage 246a. Processor 248a in this example is paired with temporary storage 246a and in this example "ingests" log 246c. Processor 248a (paired with temporary storage 246a) then transforms the ingested data in temporary storage 246a into change data. Either processor 248a or processor 248b then applies the change data in temporary storage 246a to target database 246b. The processors which are described as performing certain steps (above) are merely exemplary and any processor in storage processor complex 240 may be used for any step. Target database 246b may already have data or information stored in it prior to applying change data. For example, log 246c may record changes to source database 200 between points in time $t_1$ and $t_2$ or between states $s_1$ and $s_2$. Target database 246b, prior to application of the change data, may be in a state or time corresponding to $t_1$ or $s_1$.

In some embodiments, a target database (e.g., 246b) is a specialized database where the processes and/or structure of the database are optimized or specialized for a special purpose or function. For example, a target database may be an analytic database which is designed for analyzing large amounts of data (sometimes referred to as big data analytics). To continue the retailer example from above, the source database may be an operational database used to record transactions of the retailer in substantially real-time. The target database is (at least in this example) an analytic database (e.g., a Greenplum database) where data analysis is performed on the transactions. Some example data analysis performed on the target database include fraud detection, inventory management, earnings forecasting, and so on. This example configuration enables big data analysis to be performed on up-to-date retail transactions, without slowing down a retailer's operational server with analysis. It also enables big data analysis to be performed on a database system which is specifically designed for that task (e.g., the target database may be optimized for fast transaction servicing or to always be "up" since transaction down time would be disastrous for a retailer). In some embodiments, a target database is an online analytical processing (OLAP) database. In some embodiments, a target database is a backup and/or recovery database.

One advantage to the system shown in FIG. 2 is that it may be faster than some other CDC techniques. For example, some other CDC techniques may use application host 260 to pull log 246c into application host 260 and make changes from application host 260 to target database 246b. In some cases, network 220 includes a storage area network (SAN) and the application host performed technique requires data to pass through the SAN twice; this is slow and generally undesirable. In contrast, using processor(s) in storage processor complex 240 requires less time than some other CDC techniques because it does not require two passes through a SAN.

In some embodiments, a processor in a storage processor complex has prioritized access to storage in a storage processor complex over a host or other processor not in the storage processor complex. For example, if processor 248a (or processors 248b or 248c) in storage processor complex 240 and application host 260 both desire access to target database 246b in storage processor complex 240, processor 248a (or processors 248b or 248c) will be serviced first in such embodiments. This makes processing done by processor(s) on a storage processor complex faster than processing done on or by application host 260, in addition to or as an alternative to the performance improvement described above.

Another advantage to using processor(s) in a storage processor complex to perform CDC related processing is that there may be fewer potential points of failure. For example, if CDC processing is performed by application host 260 and application host 260 or some other device between network 220 and application host 260 fails, then the CDC process will fail. In contrast, CDC processing which uses one or more of processors 248a-248c will be successful even if application host 260 fails. There are, in other words, fewer potential points of failure. Additionally, when the software components required for CDC related processing are tested to run together in the same closed environment, there is less potential for overall processing failure.

Figure 3:
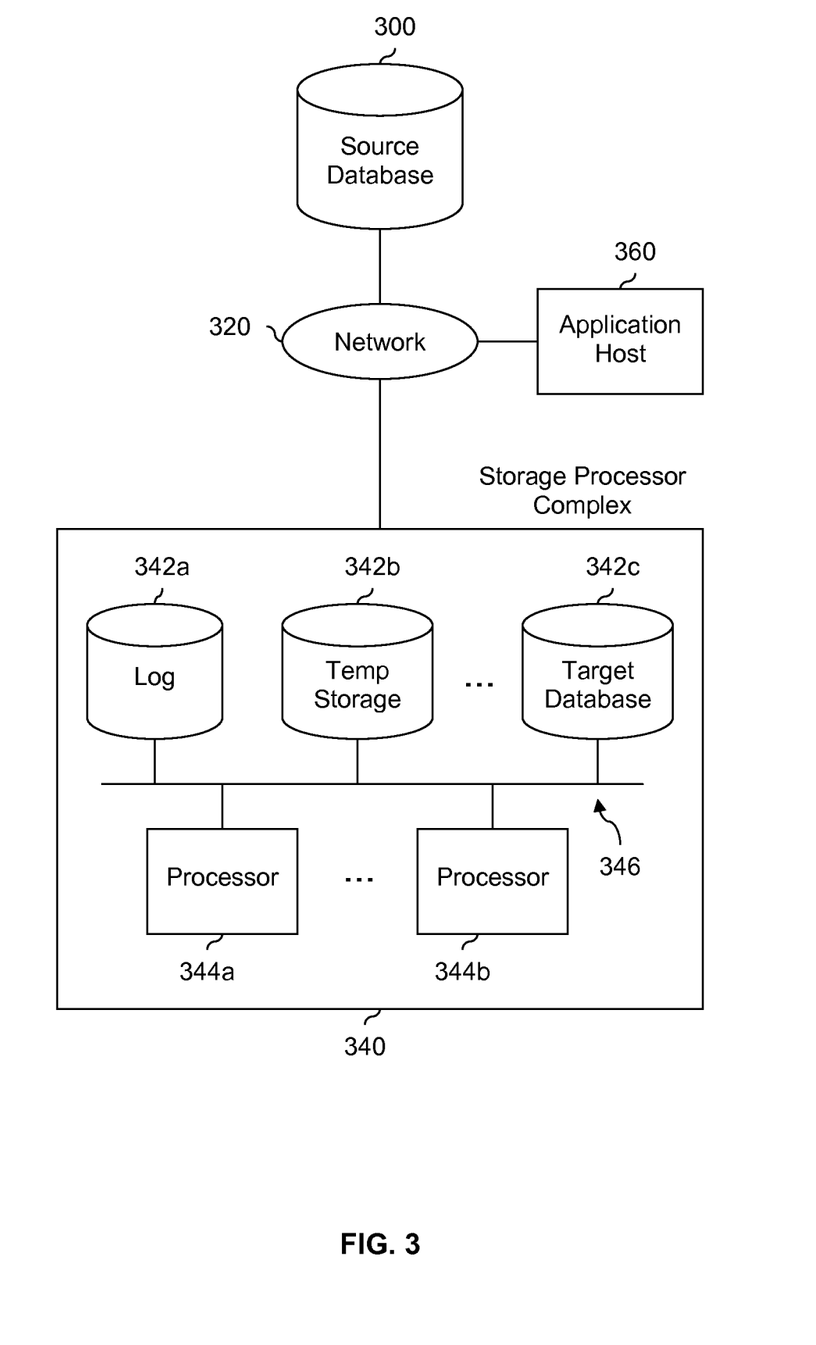
FIG. 3 is a diagram showing an embodiment of a storage processor complex which includes an internal connection between storage and processors.

FIG. 3 is a diagram showing an embodiment of a storage processor complex which includes an internal connection between storage and processors. Unlike the previous example, a given processor is not paired with a particular storage device in this example. Rather, storage 342a-342c and processors 344a-344b all hang off of internal connection 346 and any of processors 344a-344b may service any of storage devices 342a-342c.

In this example, internal connection 346 is internal to storage processor complex 340 and is not exposed to devices which are not part of storage processor complex 340. In one example, internal connection 346 includes an InfiniBand connection or network. Internal connection 346 may enable processing done by processor 344a or 344b to be faster than processing done by a processor outside of the storage processor complex (e.g., application host 360) when access to/from storage in storage processor complex 340 is desired (e.g., to/from log 342a, temporary storage 342b, and/or target database 342c).

Log 342a is located on storage processor complex 340. For example, source database 300 writes log 342a to storage processor complex 340 via network 320. In some embodiments, network 320 includes a SAN and source database 300 goes through the SAN to write log 342a on storage processor complex 340.

Referring back to FIG. 1, any of steps 100, 102, 104, and 106 may be performed by processor 344a or 344b. As before, the number of units of storage and number of processors shown in FIG. 3 is merely exemplary and is not intended to be limiting.

For the same reasons described above, the example system shown in FIG. 3 may be faster and/or have fewer potential points of failure compared to some other systems.

After CDC changes are applied to a target database (e.g., using the exemplary systems shown in FIG. 2 or FIG. 3), any desired processing may be performed on the target database, for example either using a processor in the storage processor complex or some other device external to the storage processor complex. For example, a target database may be an analytic database where big data analytics are performed. Analysis related processing may be performed by a processor in the storage processor complex or some other device external to the storage processor complex. In one example, an analytic database is not designed with a storage processor complex in mind and thus the analytic database is not necessarily optimized for such a system. In some such cases, a device external to the storage processor complex performs analysis related processing. In some embodiments, it is desirable to keep the processors in a storage processor complex free for CDC processing and analysis is performed using a device external to the storage processor complex.

FIGS. 2 and 3 are exemplary systems and may be combined as desired in various embodiments.

Returning to FIG. 1, there are a variety of ways in which a log can be identified at step 100 and ingested at step 102. For example, if an operating system associated with a device on which a log is located (e.g., source database 200 in the example of FIG. 2 or storage processor complex 340 in the example of FIG. 3) is mountable, then the device ingesting the log at step 102 (e.g., processor 248a) can mount that operating system and load the log via the mounted operating system. In one example, the LINUX operating system is a mountable operating system. However, if an operating system is not mountable, then the process described above is not an option. The following figures show an example process which may be used even if an operating system associated with a device on which a log is located is not mountable. In some embodiments (described in further detail below), identifying a log includes identifying blocks (e.g., physical block locations on storage) which comprise a log. In some embodiments, steps 100 and 102 in FIG. 1 are performed by different devices, entities, and/or processes, and step 100 includes offering up physical block locations and steps 102 includes consuming or using those offered up block locations.

Figure 4:
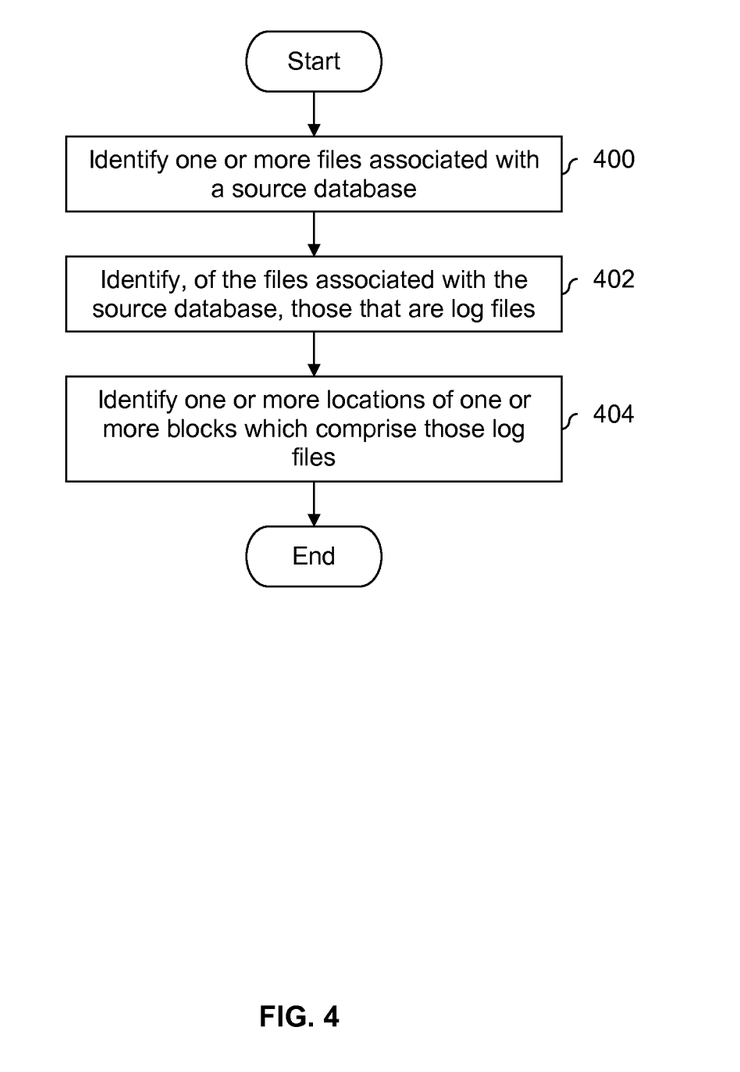
FIG. 4 is a flowchart illustrating an embodiment of a process for generating a block map associated with a log.

FIG. 4 is a flowchart illustrating an embodiment of a process for generating a block map associated with a log. In some embodiments, identifying a log at 102 in FIG. 1 includes using the example process shown here. A block map, as used herein, includes one or more block locations (e.g., physical block locations) where one or more blocks which comprise a file of interest (in this case, a log) reside. In various embodiments, various other pieces of information may be included in a block map. For example, a block map may also include metadata associated with properly using the specified block locations. For example, such metadata may indicate which blocks are associated with a specific portion of the log, or may indicate block ordering in order to properly regenerate or rebuild the log.

Figure 5:
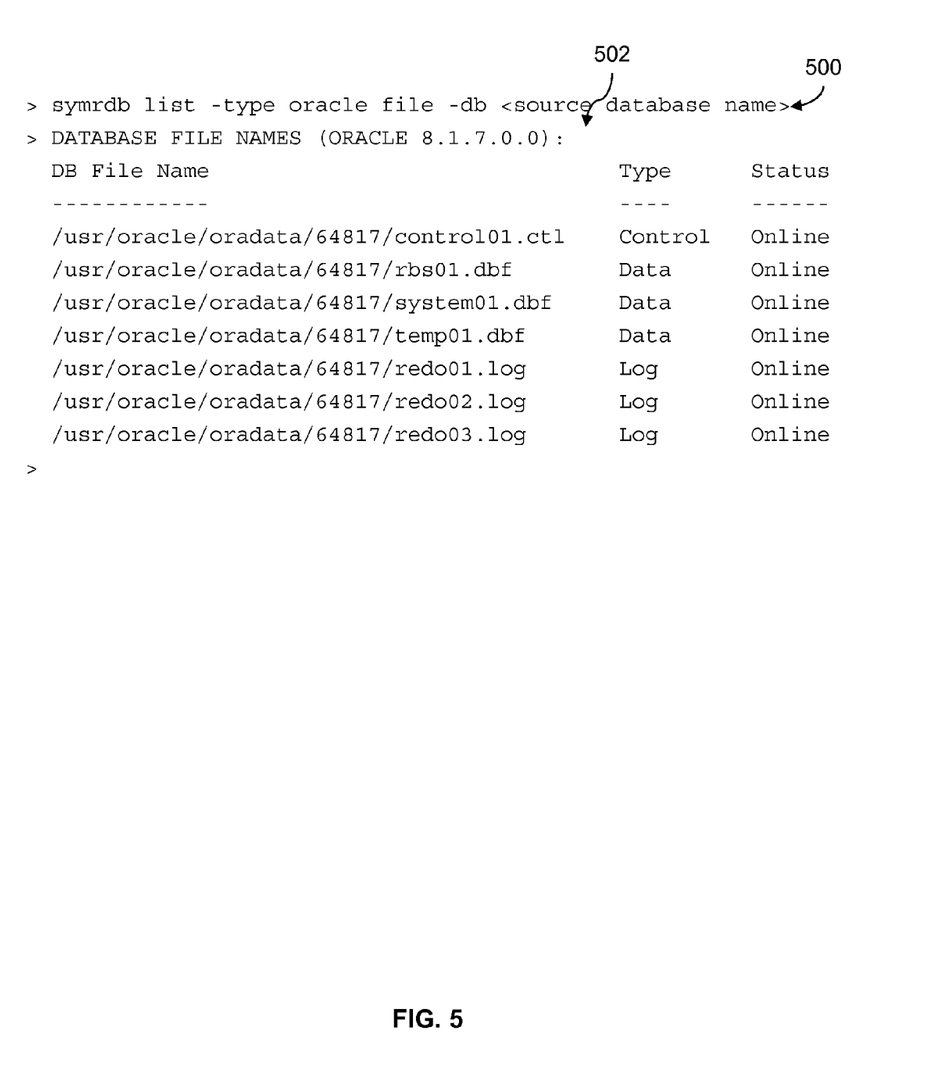
FIG. 5 is a diagram showing an embodiment of a command to identify files associated with a specified database.

At 400, one or more files associated with a source database are identified. FIG. 5 is a diagram showing an embodiment of a command to identify files associated with a specified database. In some embodiments, the example command shown in FIG. 5 is used at step 400 in FIG. 4. In the example shown, command 500 instructs files associated with an Oracle database called <source database name> to be displayed. In response, response 502 is returned. In addition to file name, the type of file (e.g., control, data or log) and the status (e.g., online or offline) of each file is presented in response 502. Command 500 may be initiated by a processor which is part of a storage processor complex and response 502 may be parsed by that processor or another processor in the storage processor complex. For brevity, some portions of response 502 which do not further illustrate the technique have been redacted.

Returning to FIG. 4, of the files associated with the source database, those that are log files are identified at 402. For example, in FIG. 5, the last 3 listed files are log files (see the Type column in response 502). Response 502 in FIG. 5 may be processed so that those files with a type of "log" are selected or identified at 402 in FIG. 4.

Figure 6:
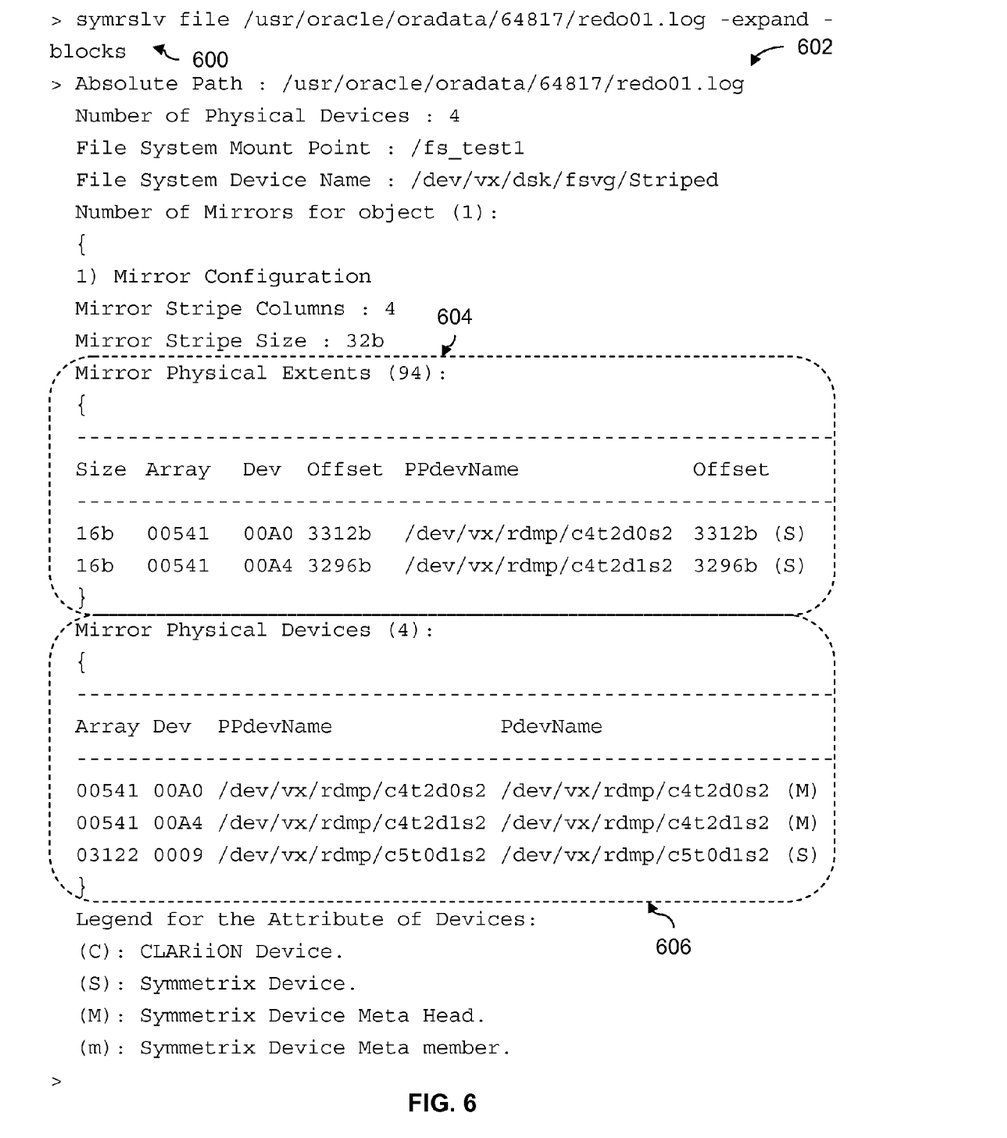
FIG. 6 is a diagram showing an embodiment of a command to identify block locations of a log file.

At 404 in FIG. 4, one or more locations of one or more blocks which comprise those log files are identified. FIG. 6 is a diagram showing an embodiment of a command to identify block locations of a log file. In some embodiments, the example command shown in FIG. 6 is used at step 404 in FIG. 4. Command 600 is used to identify the block locations of the first listed log file from FIG. 4 (i.e., /usr/oracle/oradata/64817/redo01.log). In response to command 600, response 602 is returned.

In this example, the log file is stored on a mirrored system and so the log file in question (i.e., /usr/oracle/oradata/64817/redo01.log) is located on more than one mirror. Section 604 of response 602 includes information about the mirror physical extents (e.g., primary mirrors) and section 606 of response 602 shows information about the mirror physical devices (e.g., secondary mirrors). In various embodiments, block locations associated with mirror physical extents (e.g., section 604) and/or block locations associated with mirror physical devices (e.g., section 606) are used at step 404 in FIG. 4.

In some mirrored systems, it is desirable to access a block from a mirror with the highest availability (e.g., based on references, I/O accesses, etc.). In some embodiments, when blocks are requested from a mirrored system, the mirrored system selects which mirror has the highest availability and obtains the requested blocks from the selected mirror. The mirrored system may have the best idea which of its mirrors has the highest availability at any given time and it may be convenient and/or performance may be best when the mirrored system itself selects which mirror to use.

An advantage to the technique described above is that it works even if a log is located on a device which has a mountable operating system. As such, the technique works for both mountable operating systems and unmountable operating systems, which makes the technique attractive because it can be universally used. For example, in FIG. 2, if the exemplary technique described above is used, it does not matter if an operating system on source database 200 is mountable or not. Similarly, if the exemplary technique described above is used, it does not matter if an operating system on storage processor complex 340 in FIG. 3 is mountable or not.

Depending upon the particular commands available to a system, various alternates to FIG. 4 may be used in order to determine the physical locations of blocks which comprise a log. For example, suppose the symrdb command shown in FIG. 5 and the symrslv command shown in FIG. 6 are not available in a system. The following is an example process which is an alternate to FIG. 4.

Figure 7:
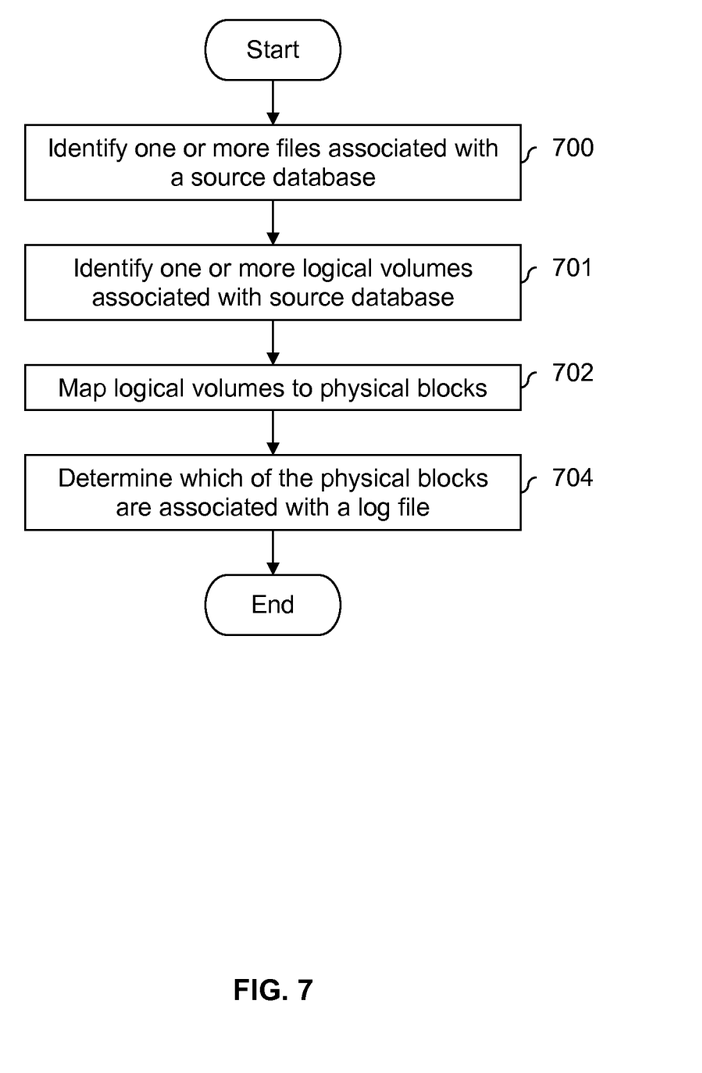
FIG. 7 is a flowchart illustrating an embodiment of a second process for generating a block map.

FIG. 7 is a flowchart illustrating an embodiment of a second process for generating a block map. For example, the symrdb command and/or the symrslv command (or their equivalents) described above may not be available in some systems, and the example process shown herein is used at step 100 in FIG. 1. At 700, one or more files associated with a source database is identified. At 701, one or more logical volumes associated with a source database are identified. For example, the symhostfs command may be used to determine information about logical volumes (or groups of logical volumes) on which a file system or database resides. At 702, the logical volumes are mapped to physical blocks. For example, the symlv command may used with a logical volume of interest as input, where the results indicate the physical blocks associated with that logical volume. The logical volume input to the symlv command may be obtained from the symhostfs command. At 704, it is determined which of the physical blocks (e.g., obtained at step 702) are associated with a log file. In this example, the filtering or "narrowing" of objects or data to those which are associated with a log file is performed at a lower level (e.g., at the block level at step 704) than in FIG. 4 (e.g., at the file level at step 402). FIGS. 4 and 8 are merely exemplary and any appropriate process and/or commands may be used.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   identifying a log which includes one or more transactions to a source database, wherein:
   the log is stored on a plurality of mirrors in a mirrored system; and
   identifying the log includes generating a block map associated with the log, wherein the block map includes one or more block locations where one or more blocks which comprise the log reside within the mirrored system, including one or more of the following: (1) a block location associated with a mirror physical extent or (2) a block location associated with a mirror physical device;
   ingesting the log using a processor included in a storage processor complex, including by using the block locations in the block map to obtain, from a mirror that has a highest availability in the plurality of mirrors, the blocks which comprise the log;
   transforming the ingested log into change data appropriate for a target database stored at least in part on the storage processor complex; and
   applying the change data to the target database.

2. The method of claim 1, wherein the source database includes one or more of the following: an operational database or an online transaction processing (OLTP) database.

3. The method of claim 1, wherein the target database includes one or more of the following: an analytic database or an online analytical processing (OLAP) database.

4. The method of claim 1, wherein the storage processor complex includes one or more of the following: an internal connection or an InfiniBand connection.

5. The method of claim 1, wherein:
   obtaining includes requesting from the mirrored system; and
   the mirrored system, in response to the request, selects which mirror has the highest availability.

6. The method of claim 5, wherein the mirrored system selects which mirror has the highest availability using one or more of the following: a number of references to a particular mirror or a number of I/O accesses to a particular mirror.

7. The method of claim 1, wherein:
   the source database writes the log to a first storage device in the storage processor complex, wherein a first processor is co-located with the first storage device;
   the processor which ingests the log is a second processor, wherein the second processor is co-located with a second storage device; and
   the second storage device is used to store the ingested log and the change data, at least temporarily.

8. The method of claim 1, wherein:
   the source database writes the log to a first storage device in the storage processor complex;
   a second storage device in the storage processor complex is used to store the ingested log and the change data, at least temporarily; and
   the first storage device, the processor which ingests the log, and the second storage device are connected by an internal connection which is internal to the storage processor complex and is not exposed to devices outside of the storage processor complex.

9. The method of claim 1, wherein generating the block map includes:
   identifying one or more files associated with the source database;
   identifying one or more logical volumes associated with the source database;
   mapping the logical volumes to physical blocks; and
   determining which of the physical blocks are associated with a log file.

10. A system, comprising:
    one or more processors, included in a storage processor complex, which are configured to:
       identify a log which includes one or more transactions to a source database, wherein:
          the log is stored on a plurality of mirrors in a mirrored system; and
          identifying the log includes generating a block map associated with the log, wherein the block map includes one or more block locations where one or more blocks which comprise the log reside within the mirrored system, including one or more of the following: (1) a block location associated with a mirror physical extent or (2) a block location associated with a mirror physical device;
       ingest the log, including by using the block locations in the block map to obtain, from a mirror that has a highest availability in the plurality of mirrors, the blocks which comprise the log;
       transform the ingested log into change data appropriate for a target database stored at least in part on the storage processor complex; and
       apply the change data to the target database; and
    storage, included in the storage processor complex, which is configured to store the target database.

11. The system of claim 10, wherein the source database includes one or more of the following: an operational database or an online transaction processing (OLTP) database.

12. The system of claim 10, wherein the target database includes one or more of the following: an analytic database or an online analytical processing (OLAP) database.

13. The system of claim 10, wherein the storage processor complex includes one or more of the following: an internal connection or an InfiniBand connection.

14. The system of claim 10, wherein:
    obtaining includes requesting from the mirrored system; and
    the mirrored system, in response to the request, selects which mirror has the highest availability.

15. The system of claim 14, wherein the mirrored system selects which mirror has the highest availability using one or more of the following: a number of references to a particular mirror or a number of I/O accesses to a particular mirror.

16. The system of claim 10, wherein:
    the source database writes the log to a first storage device in the storage processor complex, wherein a first processor is co-located with the first storage device;
    the processor which ingests the log is a second processor, wherein the second processor is co-located with a second storage device; and
    the second storage device is used to store the ingested log and the change data, at least temporarily.

17. The system of claim 10, wherein:
    the source database writes the log to a first storage device in the storage processor complex;
    a second storage device in the storage processor complex is used to store the ingested log and the change data, at least temporarily; and
    the first storage device, the processor which ingests the log, and the second storage device are connected by an internal connection which is internal to the storage processor complex and is not exposed to devices outside of the storage processor complex.

18. The system of claim 10, wherein generating the block map includes:
    identifying one or more files associated with the source database;
    identifying one or more logical volumes associated with the source database;
    mapping the logical volumes to physical blocks; and
    determining which of the physical blocks are associated with a log file.

19. A computer program product, the computer program product being embodied in a non-transitory computer readable storage medium and comprising computer instructions for:
    identifying a log which includes one or more transactions to a source database, wherein:
       the log is stored on a plurality of mirrors in a mirrored system; and
       identifying the log includes generating a block map associated with the log, wherein the block map includes one or more block locations where one or more blocks which comprise the log reside within the mirrored system, including one or more of the following: (1) a block location associated with a mirror physical extent or (2) a block location associated with a mirror physical device;
    ingesting the log using a processor included in a storage processor complex, including by using the block locations in the block map to obtain, from a mirror that has a highest availability in the plurality of mirrors, the blocks which comprise the log;

transforming the ingested log into change data appropriate for a target database stored at least in part on the storage processor complex; and applying the change data to the target database.

20. The computer program product of claim 19, wherein:
obtaining includes requesting from the mirrored system; and the mirrored system, in response to the request, selects which mirror has the highest availability.

21. The computer program product of claim 20, wherein the mirrored system selects which mirror has the highest availability using one or more of the following: a number of references to a particular mirror or a number of I/O accesses to a particular mirror.

22. The computer program product of claim 19, wherein:
the source database writes the log to a first storage device in the storage processor complex, wherein a first processor is co-located with the first storage device;

the processor which ingests the log is a second processor, wherein the second processor is co-located with a second storage device; and the second storage device is used to store the ingested log and the change data, at least temporarily.

23. The computer program product of claim 19, wherein:
the source database writes the log to a first storage device in the storage processor complex;

a second storage device in the storage processor complex is used to store the ingested log and the change data, at least temporarily; and the first storage device, the processor which ingests the log, and the second storage device are connected by an internal connection which is internal to the storage processor complex and is not exposed to devices outside of the storage processor complex.

24. The computer program product of claim 19, wherein generating the block map includes:
identifying one or more files associated with the source database;

identifying one or more logical volumes associated with the source database;

mapping the logical volumes to physical blocks; and determining which of the physical blocks are associated with a log file.

* * * * *